United States Patent Office 3,492,397
Patented Jan. 27, 1970

---

3,492,397
SUSTAINED RELEASE DOSAGE IN THE PELLET FORM AND PROCESS THEREOF
David Peters, Chester, Frank W. Goodhart, Morris Township, and Herbert A. Lieberman, Livingston, N.J., assignors to Warner-Lambert Pharmaceutical Company, Morris Plains, N.J., a corporation of Delaware
No Drawing. Filed Apr. 7, 1967, Ser. No. 629,106
Int. Cl. A61k 27/12, 9/00
U.S. Cl. 424—20                              2 Claims

ABSTRACT OF THE DISCLOSURE

A one-step method for imparting sustained release characteristics to drug-coated pellets by coating these pellets with wax ethyl cellulose combination of desired ratio.

---

The present invention relates to a composition of matter and relates more particularly to coated pellets which slowly release drug over a specified period of time.

This invention also includes within its scope a method for the production of these novel drug-coated pellets.

Many kinds of coating materials and processes have been employed to prolong, sustain or delay the release of medicament from many dosage forms, in order to give a sustained therapeutic effect of these agents. For example, British Patent No. 742,007 describes a method for forming sustained-release dosage forms by coating pellets with a medicament, dividing the resulting medicament-coated pellets into a plurality of groups, followed by coating each of these groups with variable thicknesses of coating material, so that on ingestion, these coated materials, because of their variation in thickness, will disintegrate accordingly. The net result is that medicament will be released in the body over a long period of time.

U.S. Patent 2,738,303 is another example whereby the activity or the action of the medicament may be prolonged by coating innocuous pellets with a drug, dividing the drug-containing pellets into a plurality of groups, then followed by coating with various thicknesses of a coating material.

These methods, while satisfactory, suffer a major disadvantage in that they are cumbersome to follow. As can be appreciated, the division of drug-coated pellets into groups, and coating these pellets with a coating material of different thicknesses and recombining these groups in such a proportion to give the desired release, is quite time consuming on a production scale. For example, many coating pans are required to coat each group of pellets. In addition, if there are a number drugs to be combined, each having a different solubility rate in gastric secretions, the task to achieve the desired sustained drug release rates involves even more groups of pellets and coating facilities.

Accordingly, a primary object of this invention is to provide a simple, effective, and yet inexpensive method of coating pellets which will give a therapeutically acceptable pattern of medication release with the highest degree of control and reproducibility.

Another object of this invention is to provide a one-step process for the production of sustained-release pellets adaptable to a wide range and various classes of therapeutic agents.

Other objects and advantages of this invention will become apparent from the following detailed description.

According to the process of this invention, one group of pellets is coated by a series of applications with a drug solution, followed by a coating composition which will impart sustained release characteristics as described below. These coated pellets on ingestion will release less than 30% of active ingredient in one hour, less than 50% in 3 hours, less than 75% in 5 hours, more than 80% in 7 hours, and more than 90% released in 8 hours.

As used hereinafter, pellets include non-pareil seeds which are made from fine sugar granules, which are coated with syrup and starch solutions, and dusted with starch powder to give a desired mesh size. The mesh size referred to hereinafter is that of U.S. Pharmacopeia XVII.

This coating operation generally employs about a 20 mesh pellet, but a mesh size ranging from 10 to 40 mesh can be used, depending on the concentration of drug applied to the pellets, capsule size, dosages of active ingredients and the aesthetic quality desired of the finished product.

Active and non-active materials are added to the pellets by either manual or automatic coating techniques known to the pharmaceutical compounding art.

The drug-coating solution is prepared by dissolving or suspending the active ingredient in a semi-polar solvent containing a suitable adhesive agent or gum-like materials.

Gelatin is the preferred gum, because of its inertness, solubility in hydroalcoholic solutions, and compatibility with active ingredients. Other adhesive agents, such as acacia, cellulose ethers, tragacanth, syrup, and the like, may also be used.

A typical gelatin-coating solution may comprise 6 to 8% by weight of gelatin, a calculated weight of drug(s), such as phenylpropanolamine, phenylephrine, or chlorpheniramine maleate, and hydrochloric acid to aid in gelatin solution. The gelatin and the active ingredient or ingredients are dissolved or suspended in a 70% hydroalcoholic vehicle. If practical, sufficient hydroalcoholic solution is used to dissolve the drug(s). A typical process involving the features of our invention is as follows:

The gelatin solution containing the active ingredient is added to these pellets which have been previously placed in a baffled coating pan and rotating at a speed of about 25 to 35 r.p.m. Addition of the solution is effected by either pour coating or by spray gun techniques. Pellets and added materials are allowed to tumble in the pan until the drug-coating solution is uniformly incorporated. Dusting powder, such as Talc USP, starch, powdered sugar, or combinations of these, are added in small quantities with rapid agitation between additions. Dusting powder addition is continued until pellets lose tackiness and tumble freely in the pan. Exhaust is used to remove vapors of volatile solvent and excess dusting powder. Warm air at a temperature of about 40 to 45° C. is blown over the pellets until they are dry, followed by cold air blown, until product returns to room temperature, such as 20 to 30° C.

Gelatin coating procedure is carried on as above, until the calculated quantity of drug solution is added to the pellets. The drug-coated pellets are oven dried at 35 to 40° C. for 16 to 24 hours.

Pellets are now coated with sustained release material comprising a mixture of waxes (such as caster wax, carnauba wax, paraffin wax) and ethyl cellulose. A ratio of about 1 to 10 parts by weight of wax to about 0 to 1 part by weight of ethyl cellulose, dissolved in an inert solvent such as chloroform, has been found to be the best combination to produce the desired sustained-release effect. Ethyl cellulose having a viscosity of from about 10 to 100 cps. preferably 20 cps. may be used in the process of our invention.

This wax to ethyl cellulose ratio is dependent on the relative solubility of the active ingredient in gastric and/or intestinal fluids; and the molecular structure of the drug.

Drugs with a high solubility and/or low molecular weight require a low ratio of wax to ethyl cellulose, while drugs of higher molecular weight and/or lower solubility require a higher wax to ethyl cellulose ratio. The percent coating applied to the drug-containing pellets is also dependent on these factors. For example, phenylephrine hydrochloride molecular weight 203.67, freely water soluble, requires a castor wax to ethyl cellulose ratio of 2.5 to 1 at 10% coating and gives a release of:

1 hour: 18–20% of the active ingredient.
2 hours: 33–35% of the active ingredient.
3 hours: 47–50% of the active ingredient.
5 hours: 65–70% of the active ingredient.
7 hours: 78–82% of the active ingredient.

Chlorpheniramine maleate, molecular weight 390.86, which is also water soluble, requires a ratio of 2.5 to 1 of wax to ethyl cellulose ratio with a 9% coating will give a release of only 10 to 33% of the active ingredient between hours 1 to 7, but a wax to ethyl cellulose ratio of 4 to 1, a release pattern of:

| Hours: | Percent |
|---|---|
| 1 | 18–20 |
| 2 | 36–39 |
| 3 | 41–44 |
| 5 | 67–70 |
| 7 | 78–82 | is obtained.

The above release rates are obtained by using the procedure set forth in Drug Standards, vol. 26, No. 3, page 77 et seq. can be obtained by varying only the ratio of wax to ethyl cellulose and percent coating applied.

Exemplary of the drugs which can be sustained by the process of our invention are the sympathomimetic drugs such as the free base or salts of amphetamine, ephedrine, phenmetrazine; parasympathomimetic drugs such as pilocarpine; chloinergic blocking drugs such as the free base or salts of atropine, propantheline; analgesics such as the morphine alkaloids, methadone, levallorphan; and antihistamines such as the free base or salts of chlorcyclizine, depheniramine, promethazine, pyrilamine, pheniramine, phenolpropanolamine, and the like.

It is to be understod that the foregoing detailed description is given merely by way of illustration and that many variations may be made therein without departing from the spirit of our invention.

Having described our invention, what we desire to secure by Letters Patent is:

1. Process for forming sustained-release pellets, which comprises coating pellets of inert non-pareil sugar seeds having an approximate mesh size of 20, with a hydro-alcoholic solution or suspension solvent sufficient to dissolve a calculated weight of water-soluble medicament dissolved or suspended in gelatin with hydrochloric acid to aid in gelatin solution to give a mesh size of about 18, drying said pellets, and coating said dry pellets with not more than a single one-step coating composition comprising the combination of about 1 to 10 parts castor wax to 0 to 1 parts ethyl cellulose having a viscosity of from 10 to 100 cps. in an inert volatile solvent, said single one-step coating having a low ratio of castor wax to ethyl cellulose employed with higher water solubility medicament, and a higher castor wax to ethyl cellulose ratio employed with lower water solubility medicament.

2. The pellets obtained in accordance with claim 1.

References Cited

UNITED STATES PATENTS

| 2,853,420 | 9/1958 | Lowey | 424—20 |
| 2,921,883 | 1/1960 | Reese et al. | 424—20 |
| 2,928,770 | 3/1960 | Bardani | 424—20 |
| 3,247,066 | 4/1966 | Milosovich | 424—20 XR |

SHEP K. ROSE, Primary Examiner

U.S. Cl. X.R.

424—35, 38